United States Patent [19]

Owen

[11] Patent Number: 5,131,156
[45] Date of Patent: Jul. 21, 1992

[54] LEVELING APPARATUS AND METHOD

[76] Inventor: Donald W. Owen, 4317 SW. 22nd, Apt. 1206, Oklahoma City, Okla. 73108

[21] Appl. No.: 702,619

[22] Filed: May 17, 1991

[51] Int. Cl.$^5$ .............................................. G01C 5/04
[52] U.S. Cl. ........................................ 33/367; 33/377
[58] Field of Search ................. 33/367, 371, 365, 377, 33/390

[56] References Cited

U.S. PATENT DOCUMENTS 3,101,554  8/1963  Gottula .................................. 33/377
4,686,773  8/1987  Brewer .................................. 33/367

Primary Examiner—Harry N. Haroian
Attorney, Agent, or Firm—Laney, Doughery, Hessin & Beavers

[57] ABSTRACT

A leveling apparatus includes at least two scales defined by enclosed receptacles, each having a cavity and a port into the cavity. Each receptacle also preferably has a top wall with a convex inner surface defining the top of the cavity. The top wall also preferably has a concave outer surface. The receptacles are connected through their ports in a common closed fluid communication system which is preferably only partially filled with a liquid sensitive to the levelness of a surface to be tested. The apparatus is spread across a surface whose levelness is to be tested, and the levelness is indicated by the relationships between the surfaces of the liquid in the scales and elevation indicating indicia on the scales as observed through the preferably concave top wall of each receptacle.

31 Claims, 3 Drawing Sheets

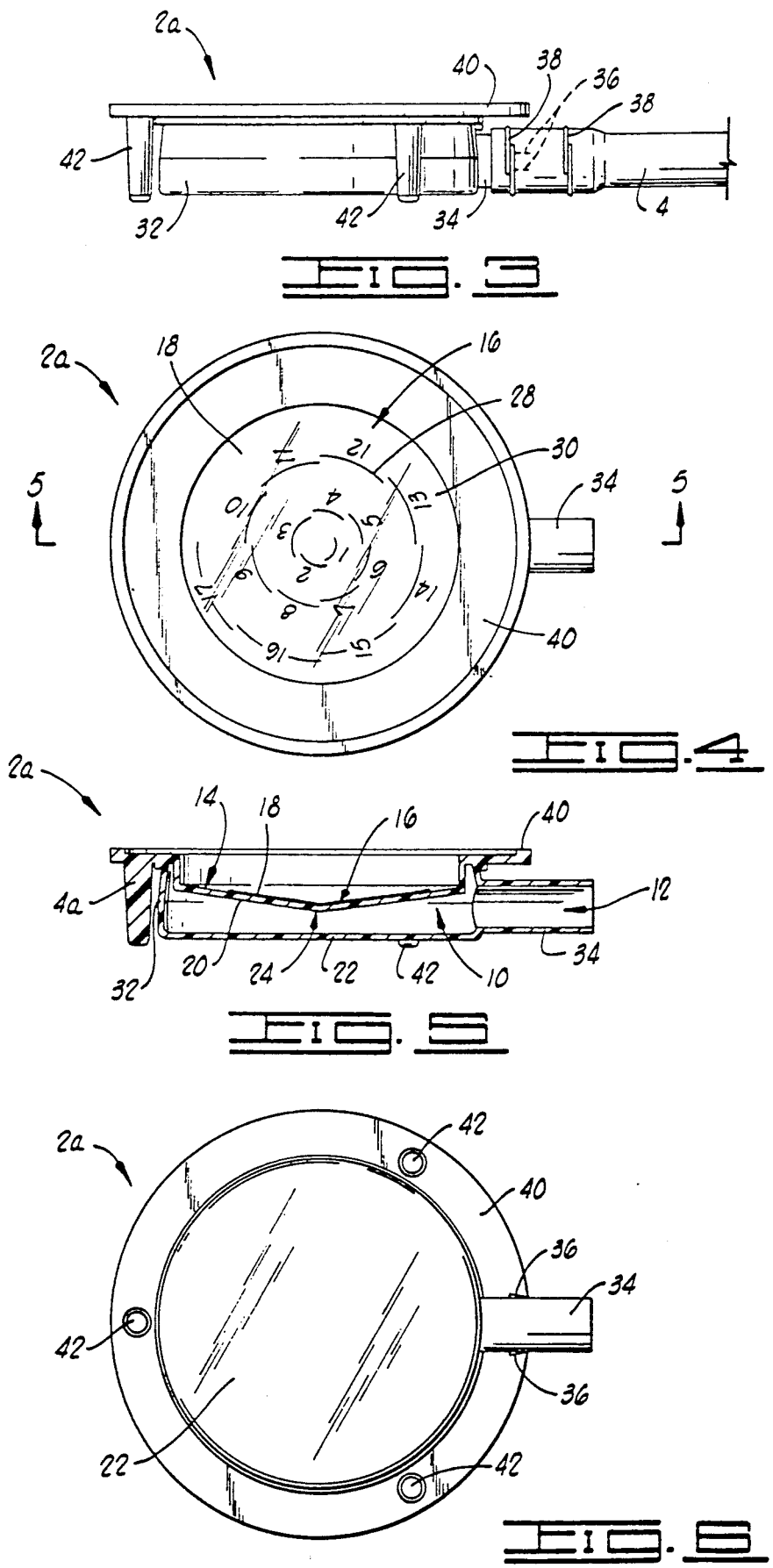

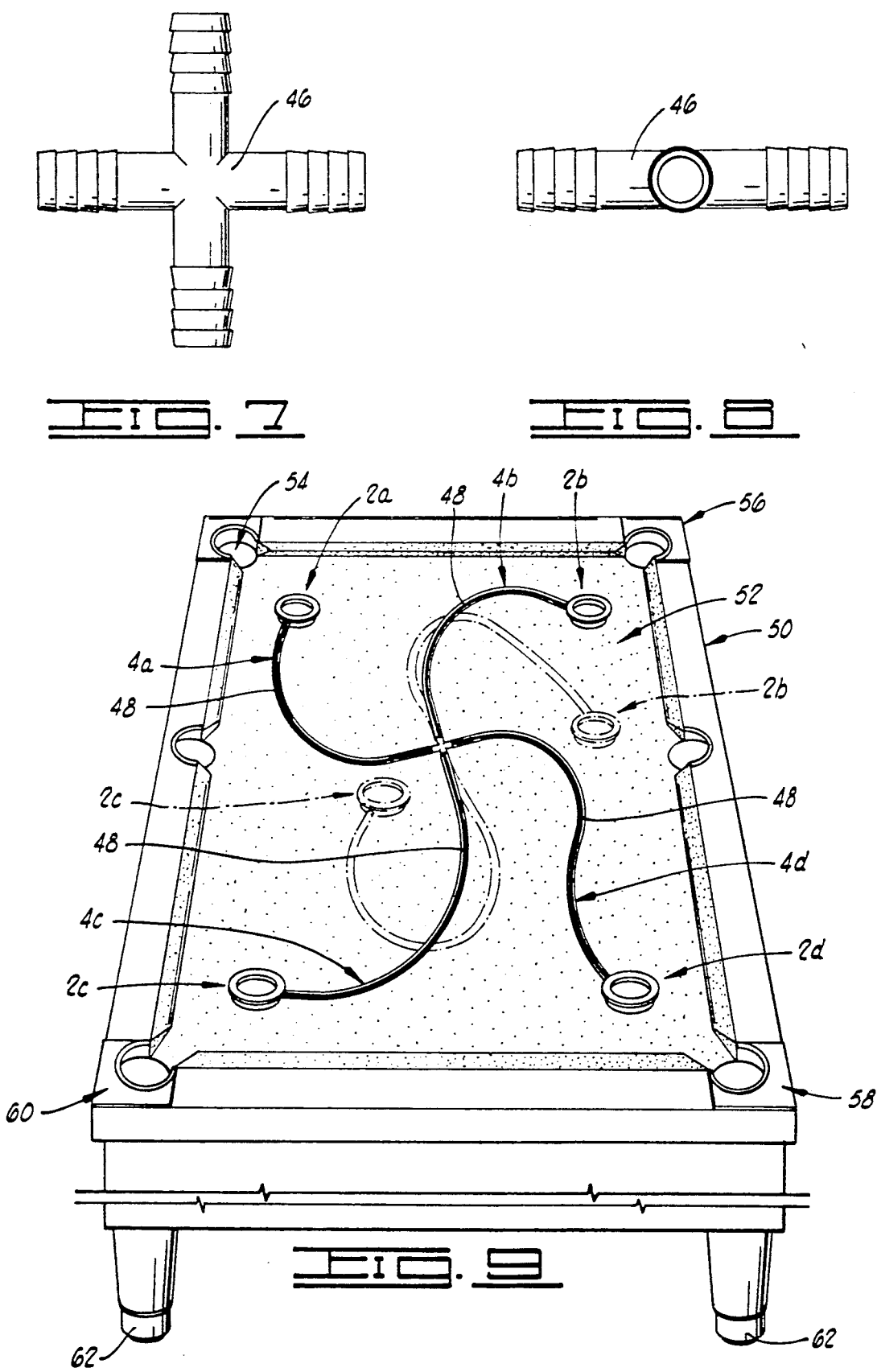

LEVELING APPARATUS AND METHOD

BACKGROUND OF THE INVENTION

This invention relates generally to leveling apparatus and methods and more particularly, but not by way of limitation, to apparatus and methods for testing and adjusting the level of a surface, such as the playing surface of a pool table and the like.

There are many applications where knowing or adjusting the levelness of a surface is important. The construction and gaming industries are only two. Because the many applications to which the present invention can be put are well known, further reference to the application of the present invention will be limited to surfaces of tables, such as pool tables and the like, but the present invention is not limited to only this application.

There are two prior types of leveling apparatus and methods of which I am aware. These are the carpenter's level and the water (or other liquid) level.

The carpenter's level has a liquid-filled container with an entrained bubble which moves relative to markings on the container to indicate the relative levelness of a surface against which the container is placed. The container is typically supported on a beam.

With regard to testing and adjusting the levelness of a table surface such as the playing surface of a pool table, the carpenter's level has the shortcoming of being too short to obtain a proper test of the expansive table surface. The carpenter's level may also not provide sufficient precision for properly testing and adjusting a pool table because of the relative inaccuracy which can be imparted by the beam used to support the bubble-containing container of the carpenter's level. For example, a slight warp in the beam can reduce the precision to which a carpenter's level can provide accurate indications of the surface levelness.

The water level is an open tube containing water (other liquids can be used). The surfaces of the water in the ends of the tube are always level so that readings can be made of the positions of the ends of the tube relative to the respective water surfaces.

Although the water level has advantages over the carpenter's level at least with regard to testing and adjusting levelness over a larger, expansive distance, the water level has the shortcoming of being an open system whereby the water can leak or spill out or evaporate. It can also be difficult to read a conventional water level, thereby impairing the accuracy of its use.

Neither of these prior leveling apparatus is satisfactory for the exemplary application of testing and adjusting the level of a pool table's playing surface. For optimum playing satisfaction, the playing surface of a game table such as a pool table must be level within a high degree of precision. This typically cannot be readily obtained with a conventional carpenter's level. The potential for damage to the table surface from water leakage or spillage is a significant drawback of the water level, as is the difficult readability of the water level. Therefore, there is the need for an improved leveling apparatus and method which are particularly suited for, but not limited to, testing and adjusting the playing surface of a pool table and the like.

SUMMARY OF THE INVENTION

The present invention overcomes the above-noted and other shortcomings of the prior art by providing a novel and improved leveling apparatus and method. The present invention is particularly suited for testing and adjusting the levelness of the surface of a pool table and the like, but it is not limited to this application.

The present invention can be used across a large surface area and still provide highly accurate and precise indications of the levelness of the surface. Despite its ability to be used across large areas, the apparatus of the present invention can be readily stored, transported and used. The present invention provides the advantages of the water level, but in a fluid system which is closed to overcome the leakage and spillage shortcomings of the water level and which includes readable scales to provide accurate and precise indications of levelness.

The apparatus of the present invention comprises a plurality of scales and means for connecting the scales in a common closed fluid communication system. In a preferred embodiment, the leveling apparatus of the present invention more particularly comprises: two enclosed receptacles, each of the receptacles having a cavity and a port communicating with the cavity defined therein; a flexible conduit connected to the ports of the receptacles; and a visually perceptible continuous medium disposed in the cavities of the receptacles and through the ports of the receptacles and in the conduit.

The present invention also provides an apparatus comprising a scale having a cavity and a convex inner surface, the apex of which convex inner surface extends into fluid disposed within the cavity of the scale.

The present invention also provides a method of testing the levelness of a surface. This method comprises: placing on the surface a closed fluid system comprising a plurality of scales connected in common fluid communication; spacing the scales from each other across an area of the surface; and determining the positions of the scales relative to the surfaces of the fluid in the scales.

With regard particularly to a pool table, for example, the present invention provides a method of leveling a table having a planar surface with a plurality, n, of corners and further having adjustable feet for adjusting the height of the table. This method comprises: placing on the planar surface a closed fluid system comprising n scales and a flexible hose network connecting the n scales in common fluid communication; moving each of the n scales to a respective one of the n corners of the planar surface; determining the relative positions between the n scales and the respective surfaces of fluid in the n scales; and adjusting the feet of the table until the relative positions between the n scales and the respective surfaces of the fluid are the same.

Therefore, from the foregoing, it is a general object of the present invention to provide a novel and improved leveling apparatus and method. Other and further objects, features and advantages of the present invention will be readily apparent to those skilled in the art when the following description of the preferred embodiments is read in conjunction with the accompanying drawings.

BRIEF DESCRIPTION OF THE DRAWINGS

FIG. 3 is a side view of a preferred embodiment of a scale of the leveling apparatus of the present invention.

FIG. 4 is a top view of the scale shown in FIG. 3.

FIG. 5 is a side sectional view of the scale taken along line 5—5 in FIG. 4.

FIG. 6 is a bottom view of the scale shown in FIG. 3.

FIG. 7 is a top view of a center coupling of a hose network of the preferred embodiment shown in FIG. 2.

FIG. 8 is a side view of the center coupling of the hose network.

FIG. 9 is a perspective view of the preferred embodiment of FIG. 2 shown on the playing surface of a pool table.

DETAILED DESCRIPTION OF PREFERRED EMBODIMENTS

The leveling apparatus of the present invention broadly comprises a plurality of scales and means for connecting the scales in a common closed fluid communication system. In the preferred embodiments described herein, the leveling apparatus is a pliant closed system partially filled with a liquid, which system includes at least two scales for defining relative measures of the liquid levels at the at least two scales.

Figure 1:
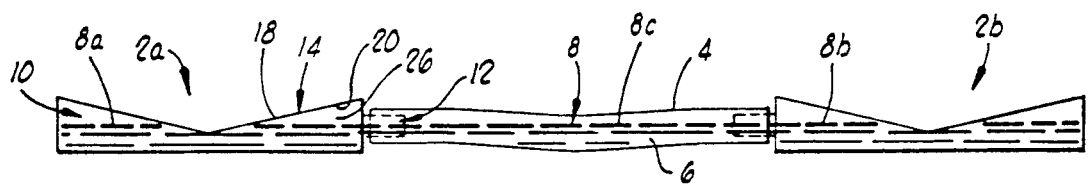
FIG. 1 is a schematic view of a preferred embodiment of the leveling apparatus of the present invention.

Referring to the simplified depiction in FIG. 1, two scales are shown implemented by enclosed receptacles 2a, 2b. The receptacles 2a, 2b are connected in fluid communication by a flexible hose 4. A continuous fluid 6 having surface 8 is disposed throughout the closed system, but in the preferred embodiments the fluid only partially fills the internal volume of the closed fluid system. Although the surface 8 as depicted in FIG. 1 may be said to be a single continuous surface throughout the apparatus, the meaning of references herein to plural surfaces of the fluid includes the respective portions of the surface 8 in the respective components of the apparatus (e.g., a surface 8a in the receptacle 2a, a surface 8b in the receptacle 2b, and a surface 8c in the hose 4).

To use this invention, the closed fluid system such as is illustrated in FIG. 1 is placed on a surface whose levelness is to be tested, the scales implemented by the receptacles 2a, 2b are spaced from each other across an area of the surface, and the positions of the scales relative to the surfaces of the fluid in the scales (receptacles) are determined.

Each of the scales of a particular implementation of the present invention is preferably identical to each of the other scales within the implementation to achieve the high degree of precision and accuracy which can be obtained with the present invention. In the two-scale and four-scale embodiments shown in FIGS. 1 and 2, respectively, each of the receptacles 2a, 2b, 2c, 2d is the same as the others so that only the receptacle 2a will be described in detail.

Referring primarily to the detailed depictions of FIGS. 3-6, the receptacle 2a of the preferred embodiments is an enclosed dish having a cavity 10 and a port 12 communicating with the cavity 10 (FIG. 5). The top of the cavity 10 is concave as defined by a convex inner surface 20 of a top wall 14 of the receptacle 2a. The concavity prevents an air pocket from forming in the cavity 10 of the closed fluid system.

The top wall 14 also has a concave outer surface 18 which permits alignment between the centerline of the port 12 and one of a plurality of elevation indicating indicia 16 carried on the top wall 14. In the preferred embodiments this alignment coincides with the surface 8 of the fluid 6 when the tested surface is level (FIG. 1). Thus, this alignment defines the nominal reading of true level in the preferred embodiments. This also defines the plus and minus range of the accurate operation of the apparatus from true level. The top wall 14 of the preferred embodiments is transparent so that the fluid surface within the cavity 10 can be observed relative to the indicia 16.

As clearly shown in FIG. 5, the convex inner surface 20 projects toward a circular flat bottom wall 22 of the receptacle 2a. A downwardly projecting apex 24 of the convex inner surface 20 is spaced from the bottom wall 22, but the apex 24 extends into a portion of the fluid within the cavity 10 as illustrated in FIG. 1. This allows the surface level of the fluid 6 in the cavity 10 to be observed adjacent the elevation indicating indicia 16. In the preferred embodiments only the apex 24 of the surface 20 (i.e., not the entire surface 20) extends low enough to enter the fluid so that there is an annulus 26 (FIG. 1) defined around the remainder of the convex inner surface 20 above the portion of the fluid 6 within the cavity 10 when the apparatus of the preferred embodiments of the present invention is in use. In the preferred embodiments, gas, such as air, is within the annulus 26; however, there can be a vacuum. The significance of there being gas within the annulus 26 of the preferred embodiments is that the present invention works without having to create or maintain a vacuum in the closed fluid system, whereby the present invention can be more easily constructed. More generally, there simply needs to be an identifiable fluid boundary relative to which indicia 16 readings can be made.

The degree of convexity or concavity of the top wall 14 is not critical to the general concept of the present invention; however, the degree, the radius from the apex of the convexity to the outermost indicia 16 of the preferred embodiments, and the desired range of operation (i.e., the degree of "unlevel" which can be accurately gauged) of a particular implementation of the present invention are interrelated so that particular design criteria must take these into account as is readily apparent to those skilled in the pertinent arts. By way of example, in the preferred embodiments the convex surface 20 is conical with a horizontal to vertical ratio of 4:1 and the radius from the tip of the apex 24 to the outermost indicia 16 is about 1⅛-inches.

The elevation indicating indicia 16 carried on the concave outer surface 18 of the top wall 14 include a plurality of raised curved ribs 28 (FIGS. 2, 4 and 5) formed integrally with the top wall 14 of the preferred embodiments. The ribs 28 are disposed in a spiral which forms a helical array within the three-dimensional concavity of the top wall 14. In the preferred embodiments, ribs 28 are arcs of respective concentric circles centered relative to the apex 24. Also integrally formed with the top wall 14 on the outer surface 18 are numerals 30 for easily identifying the adjacent ribs. The numerals 30 also form part of the indicia 16 of the preferred embodiments.

The top wall 14 extends toward the bottom wall 22 from an intersection of the top wall 14 with an upper perimeter of an annular side wall 32. The lower perimeter of the side wall 32 intersects the circular perimeter of the bottom wall 22. In the preferred embodiments, the side wall 32 is perpendicular to the bottom wall 22. Defined through the side wall 32 is the port 12.

The port 12 of the preferred embodiments is defined by an annular neck member 34 extending perpendicularly from the side wall 32. As shown in FIG. 6, the neck member 34 has diametrically opposed barbs 36 formed on its outer surface for engaging an end of the hose 4 as illustrated in FIG. 3. A spring retainer ring 38 (FIG. 3) disposed around the hose 4 in between the barbs 36 and the side wall 32 assists in securing the hose 4 in place. Additional rings 38 can be used as illustrated in the drawings.

Extending radially outward from the intersecting edges of the top wall 14 and the side wall 32 is an annular flange 40. Depending from the underside of the flange 40 are legs 42 (FIGS. 3, 5 and 6). The free ends of the legs 42 extend lower than the bottom wall 22 relative to the flange 40. Therefore, when the scale 2a is placed in proper position on a surface whose levelness is tested by the apparatus, the bottom wall 22 is spaced from such surface by the distance between the free ends of the legs 42 and the outer surface of the bottom wall 22.

In the preferred embodiments, the receptacles 2 are fabricated in a manner to ensure that each is as identical to another as possible so that a high degree of accuracy and precision are obtained. In the preferred embodiments, the top wall 14, the flange 40 and the legs 42 of the receptacles 2 are molded as integral, unitary structures. Maintaining uniformity of these structures produces the desired accuracy of the overall receptacles. That is, accuracy is achieved by maintaining a uniformity in the legs 42, which link the scale indicia 16 to the surface whose levelness is to be tested, and in the relationship between the legs 42 and the top wall 14 with its elevation indicating indicia 16 because such uniformity ensures that each scale will have the same orientation to the surface. For example, making this structure by injection molding polycarbonate, which does not warp when removed from the mold, has produced scales which are accurate within about 0.005" (about the thickness of a sheet of typing paper). It is contemplated that other techniques and materials can be used provided that they achieve the desired precision and accuracy for the particular application.

Similarly, the bottom wall 22, the side wall 32 and the neck member 34 of the receptacles 2 of the preferred embodiments are molded as integral, unitary structures. This structure is glued, ultrasonically welded or otherwise connected to the top wall/flange/legs structure to complete one receptacle 2.

Referring to FIGS. and 2, the means for connecting the scales in a common closed fluid communication system will be more particularly described. As mentioned, in the FIG. 1 representation, the means includes the hose 4. The hose 4 is preferably flexible enough that it lies flat under its own weight. Conventional surgical tubing made of natural latex rubber has been found to be one suitable material for the hose 4. Also as previously mentioned, the hose 4 is secured to the respective neck members 34 by the barbs 36 and the retaining rings 38 (FIGS. 3 and 6).

Figure 2:
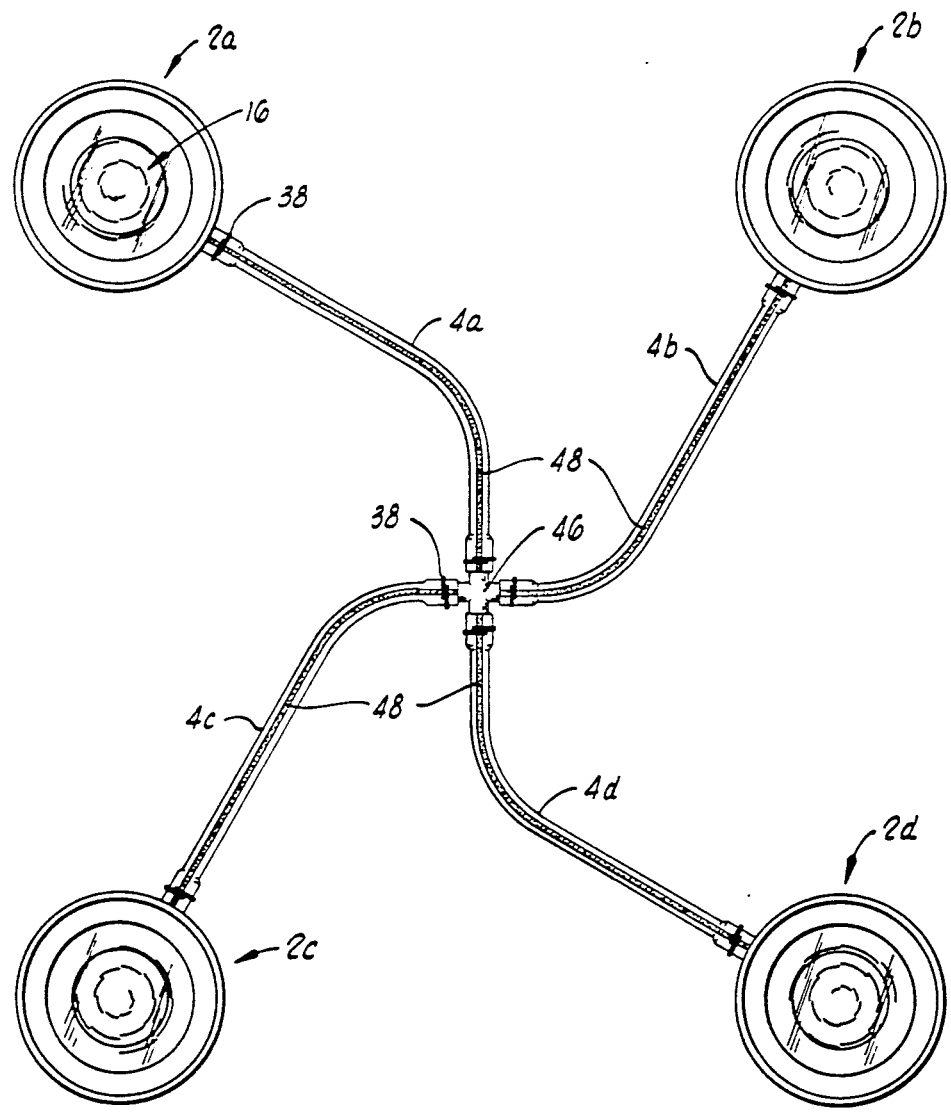
FIG. 2 is a plan view of another preferred embodiment of the leveling apparatus incorporating elements from the embodiment of FIG. 1.

When more than two scales are used in the apparatus of the present invention, a hose network 44 connects all the scales in common fluid communication. The preferred embodiment network 44 for four scales is illustrated in FIG. 2. This network 44 includes four hose segments 4a, 4b, 4c, 4d. Each of these segments has one end connected to a respective scale and another end connected in common to a conventional coupling 46. The coupling 46 is shown in more detail in FIGS. 7 and 8. The connections between hose segments and the coupling 46 are similar to the connections between the hose segments and the neck members 34 of the scales except that the coupling 46 has circumferential ribs rather than discrete barbs.

Each hose or hose segment 4 has indicia marked on it for indicating the orientation of the hose or hose segment on the surface whose levelness is tested by the present invention. As shown in FIG. 2, the indicia include lines 48 marked linearly or longitudinally along the top of each hose or hose segment. When the apparatus of the present invention is placed on the surface to be tested, the scales are to be laid on the surface so that the indicia marked on the hose or hose segments indicate that they are properly oriented, specifically that they are not twisted. If the lines 48 are visible as shown in FIG. 2, the apparatus is properly oriented. If part of one of the lines 48 is not visible when viewed from above, then the respective hose is twisted.

The orientation of the apparatus whereby the hoses 4 are not twisted is important to ensure that the fluid medium within the closed system is continuous throughout the hose network and the scales. In the preferred embodiments, the medium is a visually perceptible liquid so that the medium can be readily observed through the transparent top wall 14 in relation to the level indicating indicia 16. An example of a suitable liquid is a mixture of about 80 percent by volume isopropyl alcohol and about 20 percent by volume water with a greenish-yellow fluorescent dye which is water soluble. This has low viscosity, good wetting and antifreeze characteristics.

The liquid only partially fills the closed fluid system, but it is sufficiently present to extend from within the cavities 10 and ports 12 of all the receptacles 2 in the system and throughout the interconnecting hose network. The remainder of the volume of the closed fluid system contains air or other suitable gas so that there is no vacuum in the preferred embodiments. Such partial filling of the system with the level sensitive liquid allows movement of the liquid in response to the sensed levelness of the tested surface. Partial filling also uses less liquid, thereby reducing expense.

Referring to FIG. 9, the method of using the apparatus shown in FIG. 2 for leveling a pool table 50 will be described. The pool table 50 has a planar playing surface 52 with four corners 54, 56, 58, 60 as shown in FIG. 9; however, the present invention can be used for leveling a table having any number, n, of corners. In the preferred embodiment of the method of the present invention, the apparatus to be used for leveling has the same number, n, of scales as there are corners; however, the method of the present invention is not limited to having the same number of scales as corners. The method of the present invention also is not limited to use with tables or surfaces with corners as is readily apparent. The present invention is more generally adapted for testing levelness at a number of points of a surface, which number of points for any one test is the number of scales of the apparatus.

To level the pool table 50, the closed fluid system apparatus shown in FIG. 2 is placed on the planar playing surface 52 of the table 50. In placing the apparatus on the surface, the scales and hoses should be placed so that the indicia 48 marked on the hoses indicate that they are not twisted. The scales are supported on the legs 42 which contact the playing surface 52. Each of the scales is moved to a respective one of the corners of the table 50 as shown in FIG. 9 by the solid line representation of the apparatus of the present invention. The level of the visually perceptible liquid in each scale is determined by reading the respective scale numeral 30 of the rib 28 of the indicia 16 adjacent to which the surface of the liquid in the respective receptacle 2 is observed to be disposed. If the readings of the various scales are different, then the playing surface 52 is not level. For the numerals 30 shown in the layout of FIG. 4, the scale giving the higher or highest numeric reading has the lower or lowest relative position. To bring the surface 52 to level, feet 62 (two of which are visible in FIG. 9) or other height adjusting mechanisms of the table are adjusted until the fluid levels in all the scales yield the same readings relative to the indicia 16.

The method of the present invention can also be used to test for high or low areas in relation to an overall planar surface. This is illustrated in FIG. 9 by the two scales 2b, 2c shown in dot-dash lines moved to interior locations. Different readings at such other locations indicate that the surface is not fully planar (flat). To remedy this condition, the surface itself would need to be deformed, machined or otherwise modified.

Thus, the present invention is well adapted to carry out the objects and attain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

What is claimed is:

1. A leveling apparatus, comprising:
   a plurality of scales;
   means for connecting said scales in a common closed fluid communication system; and
   a visually perceptible liquid disposed in said common closed fluid communication system;
   wherein each of said scales includes an enclosure having a top, said top having a convex inner surface only the apex of which extends into a portion of said visually perceptible liquid within said enclosure so that there is an annulus defined around the remainder of said convex surface above said portion of fluid when said apparatus is placed in use.

2. An apparatus as defined in claim 1, wherein said top has a concave outer surface and further wherein each of said scales further includes elevation indicating indicia disposed in a concentric relationship on said concave surface.

3. An apparatus as defined in claim 2, wherein said indicia are disposed in a helical array on said concave surface.

4. A leveling apparatus, comprising:
   a plurality of scales;
   means for connecting said scales in a common closed fluid communication system; and
   a visually perceptible liquid disposed in said common closed fluid communication system;
   wherein each of said scales includes an enclosed dish into which a port is defined, said port having a centerline substantially coinciding with the upper surface level of the liquid within said system at nominal true level.

5. A leveling apparatus, comprising:
   a plurality of scales; and
   means for connecting said scales in a common closed fluid communication system;
   wherein each of said scales includes a flat dish having a bottom wall, a side wall extending from said bottom wall, and a top wall extending from said side wall toward said bottom wall.

6. An apparatus as defined in claim 5, wherein each of said scales further includes a neck member extending from said side wall, said neck member having barbs thereon for engaging said means for connecting.

7. An apparatus as defined in claim 5, wherein each of said scales further includes:
   a flange extending from said side wall; and
   a plurality of legs extending from said flange to free ends of said legs disposed lower than said bottom wall relative to said flange.

8. A leveling apparatus, comprising:
   a plurality of scales; and
   means for connecting said scales in a common closed fluid communication system;
   wherein each of said scales includes an integrally formed unitary structure including a top wall, a flange extending from said top wall, and a plurality of legs extending from said flange for supporting said scale on a surface.

9. A leveling apparatus, comprising:
   a plurality of scales; and
   means for connecting said scales in a common closed fluid communication system, said means for connecting including a flexible conduit connecting said scales, wherein said conduit has indicia defined along the top thereof for indicating proper orientation of said conduit on a surface whose level is to be tested by said apparatus.

10. A leveling apparatus, comprising a pliant closed system partially filled with a liquid, said system including at least two scales for defining relative measures of the liquid levels at said at least two scales, wherein each of said scales includes an enclosure having a top, said top having a conical inner surface the apex of which extends into a portion of said liquid which is within said enclosure when said apparatus is placed in use.

11. An apparatus as defined in claim 10, wherein said top has a concave outer surface and further wherein each of said scales further includes elevation indicating indicia disposed on said concave surface.

12. A leveling apparatus, comprising a pliant closed system partially filled with a liquid, said system including at least two scales for defining relative measures of the liquid levels at said at least two scales, wherein each of said scales includes an enclosed dish into which a port is defined, said port having a centerline substantially coinciding with the upper surface level of the liquid within said system at nominal true level.

13. A leveling apparatus, comprising a pliant closed system partially filled with a liquid, said system including at least two scales for defining relative measures of the liquid levels at said at least two scales, wherein each of said scales includes a flat dish having a bottom wall, a side wall extending from said bottom wall, and a top wall extending from said side wall toward said bottom wall.

14. An apparatus as defined in claim 13, wherein each of said scales further includes:
   a flange extending from said side wall; and
   a plurality of legs extending from said flange to free ends of said legs disposed lower than said bottom wall relative to said flange.

15. An apparatus as defined in claim 13, wherein:

said system further includes a flexible conduit connecting said scales; and each of said scales further includes a neck member extending from said side wall, said neck member having barbs thereon for engaging said conduit.

16. An apparatus as defined in claim 15, wherein said conduit has indicia defined along the top thereof for indicating proper orientation of said conduit on a surface whose level is to be tested by said apparatus.

17. A leveling apparatus, comprising:

two enclosed receptacles, each of said receptacles having a cavity and a port communicating with said cavity defined therein;

a flexible conduit connected to said ports of said receptacles; and a visually perceptible continuous medium disposed in said cavities of said receptacles and through said ports of said receptacles and in said conduit;

wherein each of said receptacles includes a top, said top having a convex inner surface the apex of which extends into a portion of said visually perceptible continuous medium which is within said cavity of the respective one of said receptacles.

18. An apparatus as defined in claim 17, wherein said top has a concave outer surface and further wherein each of said receptacles further includes elevation indicating indicia disposed in a concentric relationship on said concave surface thereof.

19. A leveling apparatus, comprising:

two enclosed receptacles, each of said receptacles having a cavity and a port communicating with said cavity defined therein;

a flexible conduit connected to said ports of said receptacles; and a visually perceptible continuous medium disposed in said cavities of said receptacles and through said ports of said receptacles and in said conduit;

wherein each of said receptacles includes an enclosed dish, defining said cavity thereof, into which said port is defined, said port having a centerline substantially coinciding with the upper surface level of the visually perceptible continuous medium at nominal true level.

20. A leveling apparatus, comprising:

two enclosed receptacles, each of said receptacles having a cavity and a port communicating with said cavity defined therein;

a flexible conduit connected to said ports of said receptacles; and a visually perceptible continuous medium disposed in said cavities of said receptacles and through said ports of said receptacles and in said conduit;

wherein each of said receptacles includes a flat dish having a bottom wall, a side wall extending from said bottom wall, and a top wall extending from said side wall, said top wall having a surface extending toward said bottom wall.

21. An apparatus as defined in claim 20, wherein each of said receptacles further includes:

a flange extending from said side wall; and a plurality of legs extending from said flange to free ends of said legs disposed lower than said bottom wall relative to said flange.

22. A leveling apparatus, comprising a scale having a cavity and a convex inner surface, the apex of which convex inner surface extends into fluid disposed within said cavity of said scale, and said further having a port for communicating said cavity with a closed fluid system.

23. An apparatus as defined in claim 22, wherein said fluid into which said apex extends is a liquid partially filling said cavity.

24. An apparatus as defined in claim 22, wherein said apparatus further includes a plurality of said scales and a flexible hose network connecting said cavities of said plurality of scales in closed common fluid communication.

25. An apparatus as defined in claim 24, wherein said hose network has indicia defined along the top thereof for indicating proper orientation of said hose network on a surface whose level is to be tested by said apparatus.

26. An apparatus as defined in claim 22, wherein said scale has a concave outer surface and further wherein said scale further includes elevation indicating indicia disposed on said concave surface.

27. An apparatus as defined in claim 22, wherein said scale includes an enclosed dish, having said convex surface and defining said cavity, into which said port is defined, said port having a centerline substantially coinciding with the upper surface level of the fluid at nominal true level.

28. An apparatus as defined in claim 22, wherein said scale includes a flat dish having a bottom wall, a side wall extending from said bottom wall, and a top wall extending from said side wall toward said bottom wall, said walls defining said cavity and said top wall having said convex surface.

29. An apparatus as defined in claim 28, wherein said scale further includes a neck member extending from said side wall and defining said port, said neck member having barbs thereon.

30. An apparatus as defined in claim 28, wherein said scale further includes:

a flange extending from said side wall; and a plurality of legs extending from said flange to free ends of said legs disposed lower than said bottom wall relative to said flange.

31. An apparatus as defined in claim 22, wherein said scale includes an integrally formed unitary structure including a top wall having said convex inner surface, a flange extending from said top wall, and a plurality of legs extending from said flange for supporting said scale on a surface.

* * * * *

UNITED STATES PATENT AND TRADEMARK OFFICE
CERTIFICATE OF CORRECTION

PATENT NO.   :   5,131,156
DATED        :   July 21, 1992
INVENTOR(S)  :   Donald W. Owen It is certified that error appears in the above—identified patent and that said Letters Patent is hereby corrected as shown below:

Column 5, line 48, after "FIGS.", insert --1--.

Signed and Sealed this

Twenty-fourth Day of August, 1993

Attest:

BRUCE LEHMAN

*Attesting Officer*   *Commissioner of Patents and Trademarks*